United States Patent [19]

Arnold, Jr.

[11] 4,072,874
[45] Feb. 7, 1978

[54] DIRECT DRIVE FOR TURNTABLES

[75] Inventor: Frank Arnold, Jr., Locust Valley, N.Y.

[73] Assignee: Kollmorgen Technologies Corporation, Dallas, Tex.

[21] Appl. No.: 622,450

[22] Filed: Oct. 14, 1975

[51] Int. Cl.² ............................................. H02K 1/28
[52] U.S. Cl. ...................................... 310/268; 310/74; 274/1 E
[58] Field of Search ...................... 310/268, 68, 66, 67, 310/78, 74; 274/1 E

[56] References Cited

U.S. PATENT DOCUMENTS

| 2,970,238 | 1/1961 | Swiggett | 310/268 |
| 3,225,233 | 12/1965 | Kirilouckas | 310/268 L |
| 3,231,807 | 1/1966 | Willis | 310/268 X |
| 3,303,371 | 2/1967 | Moressey et al. | 310/268 |
| 3,512,025 | 5/1970 | Quellet | 310/268 X |
| 3,520,460 | 7/1970 | Lear | 310/74 X |
| 3,784,853 | 1/1974 | Wangsness | 274/1 E X |
| 3,786,288 | 1/1974 | Joannou | 310/68 |
| 3,909,643 | 9/1975 | Kishima | 310/68 |
| 3,988,024 | 10/1976 | Watanabe et al. | 274/1 E |

FOREIGN PATENT DOCUMENTS

| 598,788 | 6/1934 | Germany. | |
| 1,907,822 | 8/1970 | Germany | 274/1 E |

Primary Examiner—Donovan F. Duggan

[57] ABSTRACT

An improved direct drive for turntables having a disk-shaped armature integrally coupled to the turntable and concentrically arranged about the shaft of the turntable for causing rotation of the turntable during the application of current to the disk-shaped armature. Advantageously, when such an arrangement is used with audio turntables a disk changer mechanism can be readily accommodated in the turntable.

11 Claims, 4 Drawing Figures

DIRECT DRIVE FOR TURNTABLES

The present invention relates to turntable drives, and more particularly to direct drives for turntables. It should be understood that the term word "turntables" as used in this specification is defined to include precision turntables for audio, video, and instrumentation usage.

As is well known, the drive system of an audio turntable must rotate the platter, and the record or disk placed thereon, at the proper speed and ideally as noiselessly and free from vibration as possible. Vibrations in the drive system are detected by the phonograph cartridge and manifest themselves as objectionable "rumble" in the reproduced sounds. Similarly, fluctuations in the speed of rotation of the platter and record can result in undesirable "wow" and "flutter." Heavy, accurately balanced platters are often utilized to compensate for irregularities in the drive system.

The two general approaches to drive systems for audio and other types of turntables are indirect drives and direct drives. Indirect drive systems, i.e., where the motor is indirectly coupled to the platter by means of belts and/or rubber wheels, often employ various vibration-damping components such as rubber friction wheels to control rumble. However, such indirect drive systems do not satisfactorily control rumble and additionally are prone to causing undesirable wow and flutter.

Direct drive systems generally employ brushless d.c. motors which have a ring coil mounted on the platter and another ring having a plurality of separate windings or coils affixed to the base of the turntable. The ring coil coupled to the platter is continuously energized and the coils coupled to the base are selectively energized in response to signals from Hall probes spaced around the motor, with the flux from the base coils interacting with the flux from the platter coil to cause rotation of the platter. Moreover, with the brushless d.c. motor iron return means is required to connect the opposite poles to a flux return path. Although such direct drive systems have substantially reduced rumble and wow or flutter, they do not readily accommodate a record changer mechanism. Thus, such brushless d.c. motors are generally limited to "manual" or single record operation.

It is an object of the present invention to provide an improved direct drive for turntables.

It is a further object of the present invention to provide an improved direct drive for turntables which will readily accommodate a disk changer mechanism for multiple, as opposed to single, disk operation.

It is a still further object of the present invention to provide an improved direct drive of the axial type for turntables which provides a low profile, eliminating the need to utilize non-structional iron flux return paths between the poles.

It is a still further object of the present invention to provide an economical direct drive for turntables which is reliable and accurate in operation.

It is a still further object of the present invention to provide an improved direct drive for turntables including an ironless moving coil armature which provides smooth commutation and essentially zero cogging at low direct drive speeds.

Other objects, aspects, and advantages of the present invention will be apparent from the detailed description and the drawings.

Briefly, an improved direct drive for turntables is provided in accordance with the present invention, including an armature concentrically arranged about the shaft of the turntable and fixedly coupled to the turntable for causing rotation thereof, magnet means fixedly coupled to the deck of the turntable supplying magnetic flux to the armature, brushes spaced from the magnet means and fixedly coupled to the deck, the brushes being arranged for continuous contact with the armature so that when current is applied to the brushes a circuit is completed through the armature with the current in the armature coacting with the magnetic flux from the magnet means to apply forces to the armature which induce rotation of the turntable coupled thereto.

The preferred embodiment of the present invention is illustrated in the drawings. However, it should be expressly understood that the present invention should not be construed as being limited solely to the illustrated preferred embodiment. The drawings are as follows.

Figure 1:
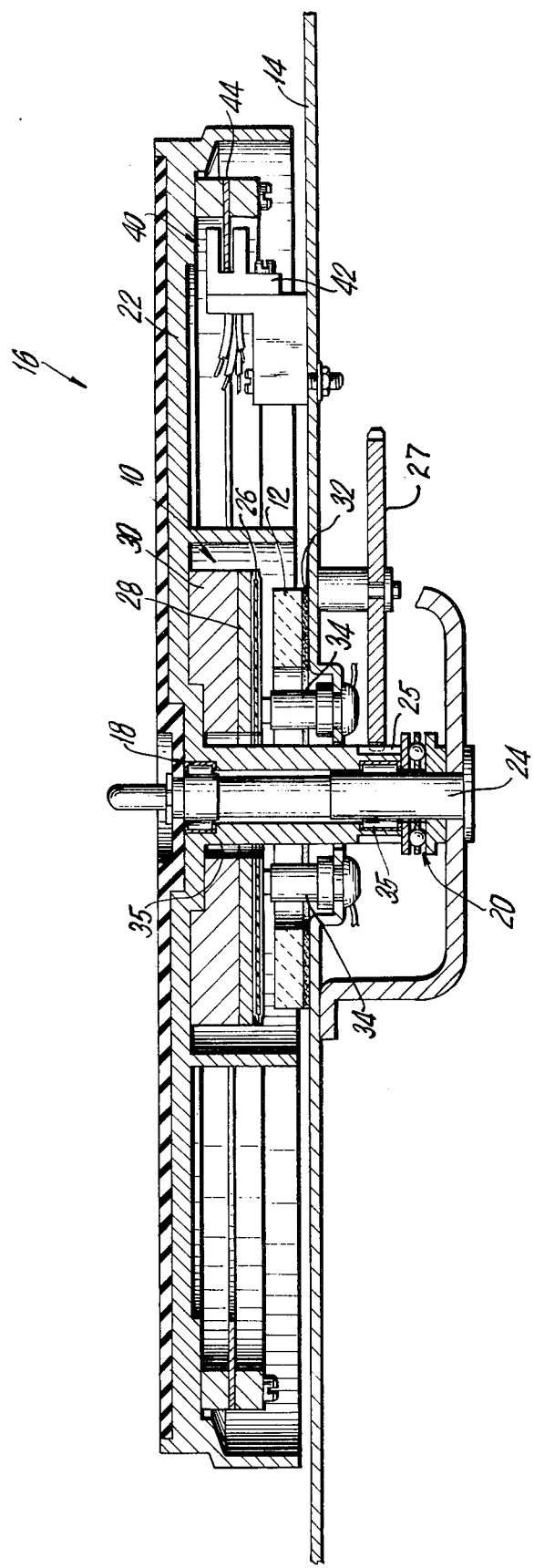
FIG. 1 is a cross-sectional view of a turntable drive system in accordance with the present invention.

Referring to FIG. 1, a d.c. direct drive motor in accordance with the present invention is generally illustrated at 10. The d.c. direct drive motor 10 includes a ceramic ring magnet 12 bonded to the deck 14 of the turntable 16 and positioned concentric to a hollow shaft 18 integrally formed with the platter 22 of the turntable 16. The hollow shaft 18 is mounted on a stationary stud shaft 24 and supported by thrust bearings 20 for rotation of the platter 22 relative to the deck 14. Advantageously, the hollow shaft 18 includes an integrally formed disk changer gear 25 at its lower end adjacent the thrust bearings 20 for engagement with the changer gear 27 of a disk changer mechanism (not shown).

The d.c. direct drive motor 10 also includes a disk-shaped armature 26 concentrically arranged about the hollow shaft 18 and fixedly coupled to the platter 22, e.g., by bonding with a suitable adhesive such as E767 adhesive available from U.S. Polymeric Corp. Preferably, the disk-shaped armature 26 is of the laminated type having two or more insulated layers of spaced windings such as Model U9M4 armature available from the Photocircuits Division of Kollmorgen Corporation.

Advantageously, the upper surface of the disk-shaped armature 26 may be bonded to one side of a magnetic flux return disk 28 arranged concentrically about hollow shaft 18. A suitable adhesive to effect such bonding is E767 adhesive available from U.S. Polymeric Corp. Preferably, the magnetic flux return disk 28 is made of steel having a low carbon content.

Advantageously, the other side of the magnetic flux return disk 28 may be bonded to an inertia disk 30 arranged concentrically about hollow shaft 18. A suitable adhesive to effect such bonding is E767 adhesive available from U.S. Polymeric Corp. Preferably, the inertia disk 30 is made of Steel. The other side of the inertia disk 30 is bonded directly to the bottom of the platter 22 with a suitable adhesive, such as the aforementioned type, to increase the inertia of the platter 22. However, it should be understood that the disk-shaped armature 26 may be bonded directly to the platter 22, as desired, thereby eliminating the magnetic flux return disk 28 and inertia disk 30, with the platter 22 providing the flux return path and the desired inertia.

Advantageously, the ring magnet 12 is a permanent magnet. However, it should be understood that an electromagnet may be used, as desired. The ring magnet 12 is preferably bonded at its bottom surface to a magnetic flux return ring 32 which is concentrically mounted about the hollow shaft 18 and bonded to the deck 14 of the turntable 16. The bonding is effected with a suitable adhesive such as grade 306 adhesive available from Loctite Corp. However, it should be understood that the ring magnet 12 may be bonded directly to the deck 14 of the turntable 16, as desired, thereby eliminating the magnetic flux return ring 32, with the deck 14 providing the flux return path.

The disk-shaped armature 26 coupled to the platter 22 overlies the ring magnet 12 and a pair of brushes 34 and is spaced therefrom. Surrounded by the ring magnet 12 and fixedly coupled to the deck 14 is the pair of brushes 34. The brushes 34 are positioned to continuously engage the bottom surface of the disk-shaped armature 26. Advantageously, the brushes 34 are of the silver-graphite type, available commercially from Pure Carbon Co., and are mechanically affixed to the deck 14, for example, by a rubber compression fit. With such a d.c. direct drive motor 10, d.c. current supplied to one of the brushes 34 flows through certain windings of the disk-shaped armature 26 and returns through the other brush 34, completing a circuit.

Figure 2:
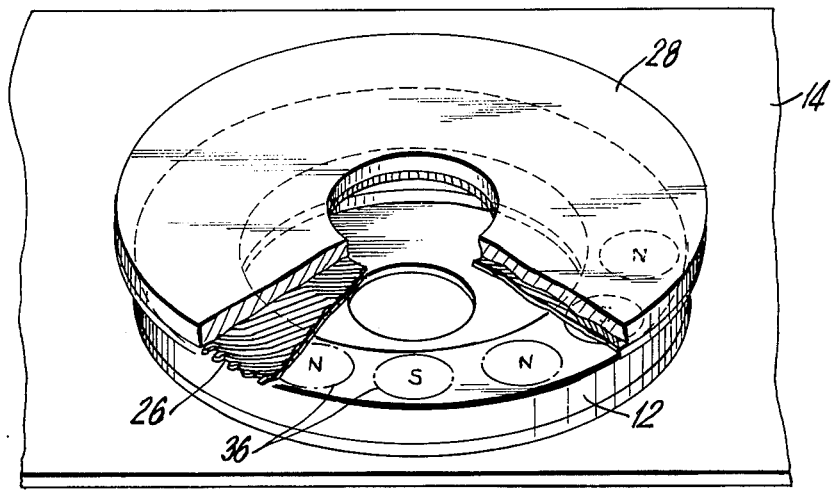
FIG. 2 is a perspective view with parts broken away of the armature and magnet ring of the direct drive system.

Referring to FIG. 2, the ceramic ring magnet 12 is shown bonded to the deck 14 and includes alternately impressed poles (North-South) 36. The disk-shaped armature 26, shown bonded to the magnetic flux return disk 28, overlies the ceramic ring magnet 12 to provide a flux path for the magnetic flux from the poles 36.

Figure 3:
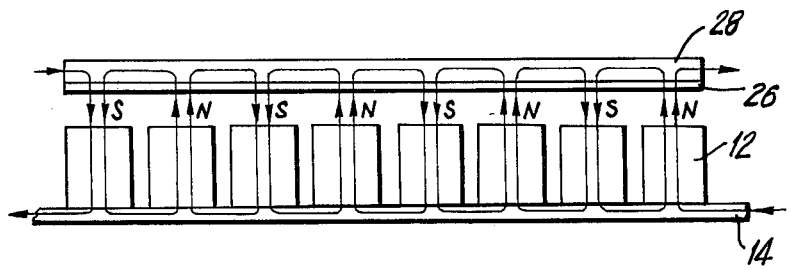
FIG. 3 is elevational view of FIG. 2, showing the instantaneous magnetic circuit.

Referring to FIG. 3, the flux paths for the poles 36 are illustrated. The magnetic flux from each North pole travels across the air gap between the ring magnet 12 and the disk-shaped armature 26, through the windings of the disk-shaped armature 26 and through magnetic flux return disk 28, back through the windings of the disk-shaped armature 26 to a South pole, and back to the North pole through the deck 14.

The interaction of the current in each of the windings (IL) and the magnetic flux (B) provides a force F in accordance with the well-known equation: $F = IL \times L$. Thus, the forces acting on the windings of the disk-shaped armature 26 tend to rotate the disk-shaped armature 26 and therefore the platter 22 about the stationary stud shaft 24. (Sintered bearings 35 are arranged at opposite ends of the hollow shaft 18 for rotation of the platter 22 and hollow shaft 18 about the stationary stud shaft 24.)

Since the magnetic flux (B) and the length (L) of each winding are fixed in value, the forces acting on the disk-shaped armature 26 and therefore the speed of rotation of the platter 22 is dependent upon the current supplied to the brushes 34.

Figure 4:
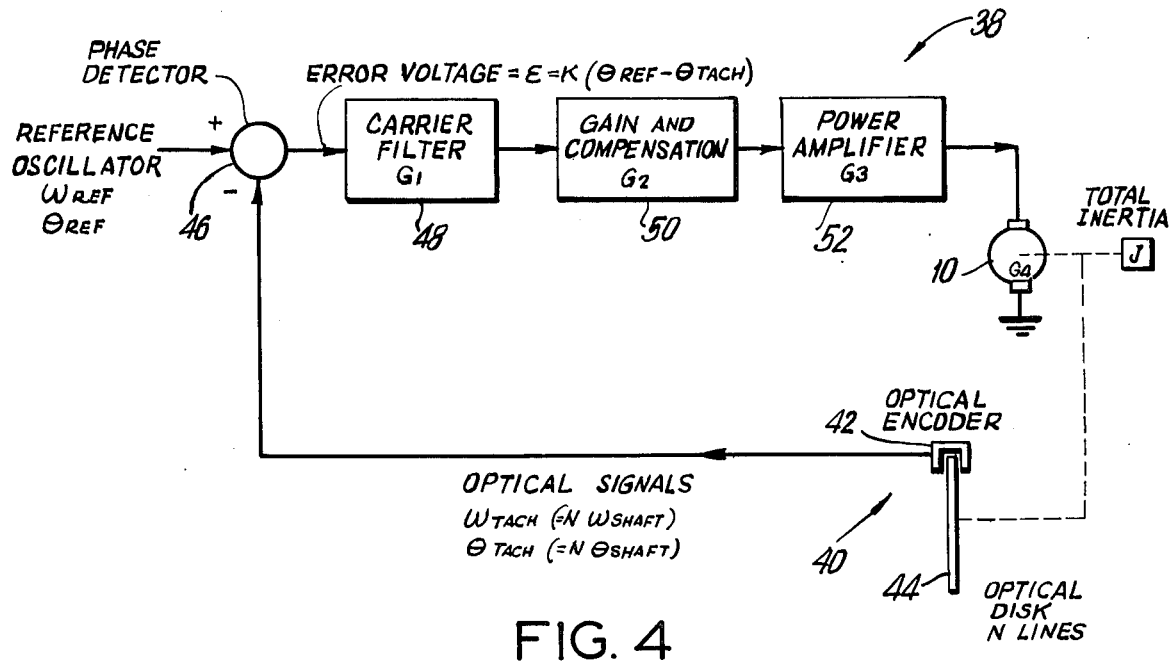
FIG. 4 is a block diagram of a phaselock control circuit for the present invention.

Referring to FIG.4, a feedback control circuit 38 for adjusting or controlling the amount of current supplied to the brushes 34 is illustrated. Preferably, the feedback control circuit 38 is in the form of a phaselocked D.C. servo. However, it should be understood that other servos, for example EMF feedback and velocity feedback servos may also be employed, as desired.

The phaselocked servo control circuit 38 includes an optical tachometer 40 including an optical encoder 42, affixed to the deck 14, a phototransistor and an LED (not shown), and an encoder frequency disk 44 fixedly clamped to the bottom surface of the platter 22, see also FIG. 1. The encoder frequency disk 44 includes a plurality of radical lines. As the platter 22 completes one revolution, N lines are swept past the optical encoder 42 and N pulses are generated. The frequency of the N pulses is compared to a reference frequency for generating an error voltage which increases or decreases the current to the brushes 34 of the D.C. direct drive 10. The reference frequency may be obtained from a reference oscillator (not shown).

The output signals from the reference oscillator and optical encoder 42 are applied to a phase detector or comparator 46. The phase detector 46 develops a D.C. error voltage proportional to the phase difference between the optical tachometer 40 frequency and the reference frequency. The phase detector 46 may be an R-S flip flop in which the leading edge of the reference signal "sets" the flip flop and the leading edge of the optical tachometer signal "resets" the flip flop. Thus, a waveform is developed whose D.C. component is proportional to the phase difference between the reference oscillator and the optical tachometer 40.

The phase detector 46 is electrically coupled to a carrier filter 48 for filtering out A.C. signal components. The carrier filter 48 is electrically coupled to a gain and compensation circuit 50, as desired, to provide signal stability and meet motor performance requirements. A power amplifier 52 electrically couples the gain and compensation circuit 50 to the D.C. motor 10. The power amplifier 52 raises the magnitude of the current to that appropriate for the D.C. direct drive motor 10. Thus, the phase detector 46 will supply input high or low signals to the D.C. direct drive motor 10 to control the speed of rotation of the platter 22 depending upon whether the phase of the optical tachometer 40 is less than or greater than that phase of the reference oscillator.

It should be understood by those skilled in the art that various modifications may be made in the present invention without departing from the spirit and scope thereof, as described in the specification and defined in the appended claims.

What is claimed is:

1. A direct drive for turntables of the type having a platter coupled to a shaft for rotation of the platter relative to the deck of the turntable, wherein the improvement comprises:

a disk-shaped armature having a plurality of insulated layers of windings thereon and concentrically arranged about the shaft and fixedly coupled to the platter;

flux return means fixedly coupled to said platter between said disk-shaped armature and said platter;

magnet means fixedly coupled to the deck for providing magnetic flux to said disk-shaped armature and said flux return means;

brushes spaced from said magnet means and fixedly coupled to the deck and arranged for continuous contact with said disk-shaped armature so that when current is applied to said brushes a circuit is completed through said disk-shaped armature with the current in said disk-shaped armature coacting with the magnetic flux from said magnet means to apply rotational forces to said disk-shaped armature for rotating the platter coupled thereto; and an inertia means coupled between said flux return means and the platter for increasing the inertia of the platter.

2. The direct drive for turntables recited in claim 1, wherein:

said magnet means is a ring magnet concentrically mounted about the shaft of the turntable and having alternating poles.

3. The direct drive for turntables recited in claim 2, wherein:

said brushes are surrounded by said ring magnet.

4. The direct drive for turntables recited in claim 1, including:

feedback control means for sensing the speed of rotation of the platter and varying the current applied to said brushes, and therefore the speed of rotation of the platter, in response to comparison with a reference level.

5. The direct drive for turntables recited in claim 4, wherein:

said feedback control means includes a frequency disc coupled to the platter, an optical encoder for providing output pulses in response to the rotation of said frequency disk, and a comparator means for receiving ouput signals from said optical encoder and comparing them to a reference frequency to control the amount of current applied to said brushes and thus the speed of rotation of the platter.

6. The direct drive for turntables recited in claim 1, wherein:

said disk-shaped armature overlies said brushes and said magnet means.

7. The direct drive for turntables recited in claim 1, wherein:

the shaft is a hollow shaft.

8. The direct drive for turntables recited in claim 1, including:

a magnetic flux return ring interposed between said magnet means and the deck.

9. A direct drive for turntables of the type having a platter coupled to a shaft for rotation of the platter relative to its deck, wherein the improvement comprises:

a disk-shaped armature concentrically arranged about the shaft and fixedly coupled to the platter, said disk-shaped armature being bonded at its upper surface to a magnetic flux return ring fixed on said platter, said armature including a plurality of insulated layers of windings;

a ring magnet concentrically arranged about the shaft and fixedly coupled to the deck, said ring magnet being spaced from said disk-shaped armature for providing magnetic flux to said disk-shaped armature and said magnetic flux return ring;

a pair of brushes surrounded by said ring magnet and fixedly coupled to the deck, said brushes being positioned with said disk-shaped armature for continuous engagement with said disk-shaped armature so that when current is applied to said brushes a circuit is completed through said disk-shaped armature with the current in said disk-shaped armature coacting with the magnetic flux from said ring magnet to apply rotational forces to said disk-shaped armature for rotating the platter coupled thereto; and an inertia means coupled between said flux return ring and the platter for increasing the inertia of the platter.

10. The direct drive for turntables recited in claim 9, including:

feedback control means for sensing the speed of rotation of the platter to vary the current supplied to said brushes, and therefore the speed of rotation of the platter, in response to comparison with a reference level.

11. The direct drive for turntables recited in claim 10, wherein:

said feedback control means includes a phaselock servo.

* * * * *